June 10, 1930.  V. T. AUBERTIN  1,763,497

WOODWORKING MACHINE

Filed Dec. 8, 1927

Inventor
V. T. Aubertin
By: Marks & Clerk
Attys

Patented June 10, 1930

1,763,497

UNITED STATES PATENT OFFICE

VILHELM THURE AUBERTIN, OF VALBY, NEAR COPENHAGEN, DENMARK

WOODWORKING MACHINE

Application filed December 8, 1927, Serial No. 238,693, and in Denmark December 11, 1926.

The present invention relates to a woodworking machine and the essential feature of the invention consists therein, that the machine is provided with means which ensure that the machine elements for working the wood and for guiding it, such as tables, plates and the like cannot be displaced to any side so that they have the effect that the said machine elements at each fresh attachment assume exactly the same position relatively to the tool shaft. This is obtained by providing the motor housing of the machine with one or more conical studs or extensions onto which the machine elements are attached the studs fitting exactly into corresponding recesses in the machine elements.

The invention is shown in the accompanying drawing in which Fig. 1 shows a vertical longitudinal section through a motor, the shaft of which at both ends serves as a tool shaft, and which for the two toolshafts has each a single stud or extension for attaching and guiding the machine elements for working the wood.

Figure 1:
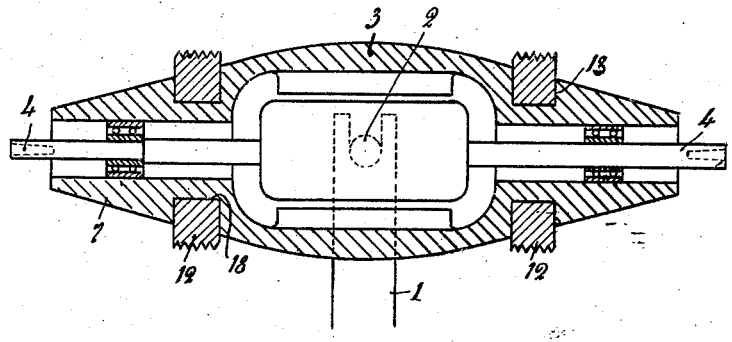
Figure 2:
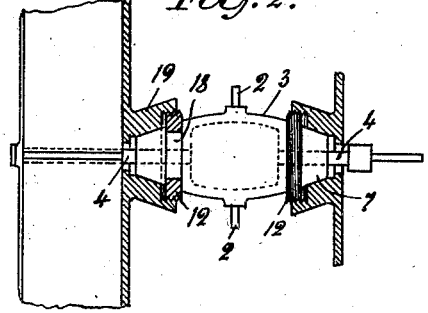
Fig. 2 is the same seen from above.

In the drawing, Figs. 1 and 2, the numeral 1 indicates a stand in which a motor with stator 3 is arranged and oscillatingly hung on a pivot 2. The stator 3 has a stud 7 which with the constructional form shown in Figs. 1 and 2 is very thick and conical and has axial holes through which the motor shaft, which as aforesaid forms tool shafts 4 at both ends is passed. The various tables, plates and the like, which are used in combination with the machine, as shown in Fig. 2 are provided with raised edges which have recesses corresponding exactly to the studs 7 and held to these studs by annular shaped threaded portion 12 which can turn in recesses 18 in the studs 7.

Figure 3:
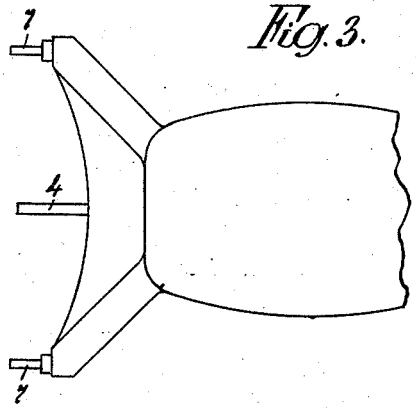
Fig. 3 shows, seen from above, a motor the housing of which at the one end has two attachments and guiding studs.

In Fig. 3 is shown another constructional form where the stator 3 has an extension provided with two pins 7′, and these need not be conical but can be cylindrical and fit exactly into holes in the various machine elements to be used with the machine.

Having now described my invention, what I claim as new and desire to secure by Letters Patent is:

1. In a woodworking machine, a stand, a motor hung for oscillation in said stand and including a shaft which is adapted to bear tools, and a stator having centering and fixing members at the respective ends and work tables having recesses corresponding to the shape of the centering and fixing members and detachably engaged therewith.

2. In a woodworking machine, in combination, a stand, a motor suspended for oscillation in said stand and including a tool bearing shaft, a stator arranged about the shaft and having the respective ends terminating in conical guiding studs, exteriorly threaded members mounted in the studs and spaced from the ends thereof, and work tables having recesses corresponding to the shape of the outer ends of the studs for snug engagement and having threaded portions detachably engageable with the exteriorly threaded members, substantially as and for the purposes set forth.

In testimony whereof I affix my signature.

VILHELM THURE AUBERTIN.